US011935266B2

(12) United States Patent
Nakano (10) Patent No.: US 11,935,266 B2
(45) Date of Patent: Mar. 19, 2024

(54) CAMERA PARAMETER ESTIMATION APPARATUS, CAMERA PARAMETER ESTIMATION METHOD, AND COMPUTER-READABLE RECORDING MEDIUM

(71) Applicant: NEC Corporation, Tokyo (JP)

(72) Inventor: Gaku Nakano, Tokyo (JP)

(73) Assignee: NEC CORPORATION, Tokyo (JP)

(*) Notice: Subject to any disclaimer, the term of this patent is extended or adjusted under 35 U.S.C. 154(b) by 338 days.

(21) Appl. No.: 17/604,837

(22) PCT Filed: Apr. 24, 2019

(86) PCT No.: PCT/JP2019/017508
§ 371 (c)(1),
(2) Date: Oct. 19, 2021

(87) PCT Pub. No.: WO2020/217360
PCT Pub. Date: Oct. 29, 2020

(65) Prior Publication Data
US 2022/0262037 A1 Aug. 18, 2022

(51) Int. Cl.
*G06T 7/80* (2017.01)
*G06T 3/20* (2006.01)
(Continued)

(52) U.S. Cl.
CPC .............. *G06T 7/80* (2017.01); *G06T 3/20* (2013.01); *G06T 3/60* (2013.01); *G06T 7/536* (2017.01)

(58) Field of Classification Search
CPC .... G06T 7/80; G06T 3/20; G06T 3/60; G06T 7/536; G06T 7/50; G06T 2207/30244; H04N 23/60; G01B 11/00
See application file for complete search history.

(56) References Cited

U.S. PATENT DOCUMENTS

2015/0029345 A1 1/2015 Ikeda
2020/0226825 A1 7/2020 Bian et al.
2020/0311979 A1* 10/2020 Chang .................. G06T 7/80

FOREIGN PATENT DOCUMENTS

JP 2010-250452 A 11/2010
JP 2016-106287 A 6/2015
(Continued)

OTHER PUBLICATIONS

English translation of Written opinion for PCT Application No. PCT/JP2019/017508, dated Jul. 23, 2019.
(Continued)

*Primary Examiner* — Ian L Lemieux
*Assistant Examiner* — Daniel C Chang
(74) *Attorney, Agent, or Firm* — Sughrue Mion, PLLC (57) ABSTRACT

A camera parameter estimation apparatus: takes three sets of three-dimensional coordinates pertaining to an object and two-dimensional coordinates corresponding to the three-dimensional coordinates, and transforms a coordinate system of the three-dimensional coordinates from a world coordinate system to a local coordinate system; calculates a linear transformation matrix based on a projection transformation expression from the transformed three-dimensional coordinates to the two-dimensional coordinates, calculates a coefficient of a quartic equation pertaining to any one of depths from a camera center to each three-dimensional coordinate, and calculates each depth; calculates the rotation matrix in the local coordinate system using each depth and the linear transformation matrix; calculates a translation vector in the local coordinate system from each depth based on the projection transformation expression; and calculates a rotation matrix and a translation vector in the world coordinate system by performing an inverse transform of the rotation matrix and the translation vector.

9 Claims, 4 Drawing Sheets

(51) Int. Cl.
*G06T 3/60* (2006.01)
*G06T 7/536* (2017.01)

(56) References Cited

FOREIGN PATENT DOCUMENTS

WO 2013/111229 A1 8/2013
WO 2019/065536 A1 4/2019

OTHER PUBLICATIONS

International Search Report for PCT Application No. PCT/JP2019/017508, dated Jul. 23, 2019.
Gao, Xiao-Shan, et al. "Complete solution classification for the perspective-three-point problem."IEEE transactions on pattern analysis and machine intelligence vol. 25, No. 8 Aug. 2003, pp. 930-943.
Kneip, Laurent, Davide Scaramuzza, and Roland Siegwart. "A novel parametrization of the perspective-three-point problem for a direct computation of absolute camera position and orientation."CVPR. IEEE Computer Society Conference on Computer Vision and Pattern Recognition. Jun. 2011.

* cited by examiner

CAMERA PARAMETER ESTIMATION APPARATUS, CAMERA PARAMETER ESTIMATION METHOD, AND COMPUTER-READABLE RECORDING MEDIUM

This application is a National Stage Entry of PCT/JP2019/017508 filed on Apr. 24, 2019, the contents of all of which are incorporated herein by reference, in their entirety.

TECHNICAL FIELD

The invention relates to a camera parameter estimation apparatus and a camera parameter estimation method for estimating external parameters of a camera for which internal parameters are already known, and further relates to a computer-readable recording medium in which is recorded a program for implementing the stated apparatus and method.

BACKGROUND ART

The technique of estimating camera parameters from an image observed in known three-dimensional coordinates is an important underlying technology in robot self-position estimation and image composition. There are two types of camera parameters, namely external parameters and internal parameters. The external parameters are parameters expressing the position and attitude of the camera in three-dimensional space, i.e., a rotation matrix and a translation vector. The internal parameters are parameters such as the lens focal length, optical center, aspect ratio, shear coefficient, lens distortion coefficient, and the like. In the following, a pair constituted by known three-dimensional coordinates and a two-dimensional point obtained by observing the three-dimensional coordinates in an image will simply be referred to as a "corresponding point".

If a camera has fixed internal parameters, i.e., if parameters such as the focal length are not changed during shooting after the lens is set in the camera, the internal parameters can be measured in advance using widely-known methods such as those of Tsai, Zhang, or the like. Such cameras having known internal parameters (referred to simply as "calibrated cameras" hereinafter) are used in applications such as autonomous driving of robots, automobiles, and the like. In such a camera, it is important to calculate the external parameters with a low amount of computations when the camera is moving. It is known that the external parameters of a calibrated camera can be calculated if at least three sets of corresponding points are given, and this is called the P3P (perspective-three-point) problem.

A method for solving the P3P problem will be described here. Non-Patent Document 1 and Non-Patent Document 2 both disclose methods related to solving the P3P problem. In the method disclosed in Non-Patent Document 1, first, using the corresponding point, the rotation matrix, the translation vector, and the camera center, the rotation matrix and the translation vector are eliminated from a projection transformation expression formed by the depth to each of three-dimensional coordinates, and a quartic equation is found for a single depth. Three depths are then calculated by solving the quartic equation. The depths are then substituted into the projection transformation expression, and the rotation matrix and translation vector, which are the external parameters, are calculated through singular value decomposition.

Additionally, in the method disclosed in Non-Patent Document 2, first, a local coordinate system centered on a single three-dimensional coordinate is defined by a special coordinate conversion constituted by two steps. A quartic equation pertaining to an angle formed by a plane on which the camera position and the x-axis are located and a plane at $z=0$ in the local coordinate system is then found. Then, by solving the quartic equation, the angle is substituted and an inverse transform from the local coordinate system to the original world coordinates is performed, and the rotation matrix and translation vector, which are the external parameters, are calculated as a result.

LIST OF RELATED ART DOCUMENTS

Non Patent Documents

Non-Patent Document 1: Gao, Xiao-Shan, et al. "Complete solution classification for the perspective-three-point problem." IEEE transactions on pattern analysis and machine intelligence 25.8 (2003): 930-943.

Non-Patent Document 2: Kneip, Laurent, Davide Scaramuzza, and Roland Siegwart. "A novel parametrization of the perspective-three-point problem for a direct computation of absolute camera position and orientation." CVPR 2011. IEEE, 2011.

SUMMARY OF INVENTION

Problems to be Solved by the Invention

However, the above-described Non-Patent Documents 1 and 2 have problems such as those described below. First, the method disclosed in Non-Patent Document 1 has a problem in that using singular value decomposition results in a high computational load and takes a long time for calculations, resulting in low stability for numerical calculations.

On the other hand, although the method disclosed in Non-Patent Document 2 does not use singular value decomposition and can therefore perform calculations more quickly than the method described in Non-Patent Document 1, the conversion to the local coordinate system requires two steps. The problem of low stability for numerical calculations therefore remains even with the method disclosed in Non-Patent Document 2.

An example object of the invention is to provide a camera parameter estimation apparatus, a camera parameter estimation method, and a computer-readable recording medium that can solve the above-described problems and estimate external parameters quickly and in one step without using singular value decomposition.

Means for Solving the Problems

To achieve the aforementioned example object, a camera parameter estimation apparatus according to an example aspect of the invention includes: a three-dimensional coordinate transforming unit configured to take three sets of three-dimensional coordinates pertaining to an object captured by a camera and two-dimensional coordinates corresponding to respective ones of the three-dimensional coordinates in an image that has been captured, and transform a coordinate system of the three-dimensional coordinates from a world coordinate system to a local coordinate system that takes one of the three-dimensional coordinates as an origin; a depth calculation unit configured to calculate a linear transformation matrix on the basis of a projection transformation expression from the three-dimensional coordinates transformed into the local coordinate system to the two-dimensional coordinates, calculate a coefficient of a quartic equation pertaining to any one of depths from a center of the camera to respective ones of the three-dimensional coordinates, and calculate each of the depths by solving the quartic equation; a rotation matrix calculation unit configured to calculate a rotation matrix of the camera in the local coordinate system using the respective depths and the linear transformation matrix; a translation vector calculation unit configured to calculate a translation vector of the camera in the local coordinate system from the respective depths on the basis of the projection transformation expression; and an inverse transform unit configured to calculate a rotation matrix and a translation vector of the camera in the world coordinate system by performing an inverse transform of the rotation matrix and the translation vector of the camera in the local coordinate system.

Additionally, to achieve the aforementioned example object, a camera parameter estimation method according to an example aspect of the invention includes: (a) a step of taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin; (b) a step of calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation; (c) a step of calculating a rotation matrix of the camera in the local coordinate system using the respective depths and the linear transformation matrix; (d) a step of calculating a translation vector of the camera in the local coordinate system from the respective depths on the basis of the projection transformation expression; and (e) a step of calculating a rotation matrix and a translation vector of the camera in the world coordinate system by performing an inverse transform of the rotation matrix and the translation vector of the camera in the local coordinate system.

Furthermore, to achieve the aforementioned example object, a computer-readable recording medium according to an example aspect of the invention stores a program including commands causing a computer to execute: (a) a step of taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin; (b) a step of calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation; (c) a step of calculating a rotation matrix of the camera in the local coordinate system using the respective depths and the linear transformation matrix; (d) a step of calculating a translation vector of the camera in the local coordinate system from the respective depths on the basis of the projection transformation expression; and (e) a step of calculating a rotation matrix and a translation vector of the camera in the world coordinate system by performing an inverse transform of the rotation matrix and the translation vector of the camera in the local coordinate system.

Advantageous Effects of the Invention

As described above, according to the invention, external parameters can be estimated quickly and in one step without using singular value decomposition.

EXAMPLE EMBODIMENT

Example Embodiment

A camera parameter estimation apparatus, a camera parameter estimation method, and a program according to an example embodiment will be described hereinafter with reference to FIGS. 1 to 4.

Coordinate System

Figure 1:
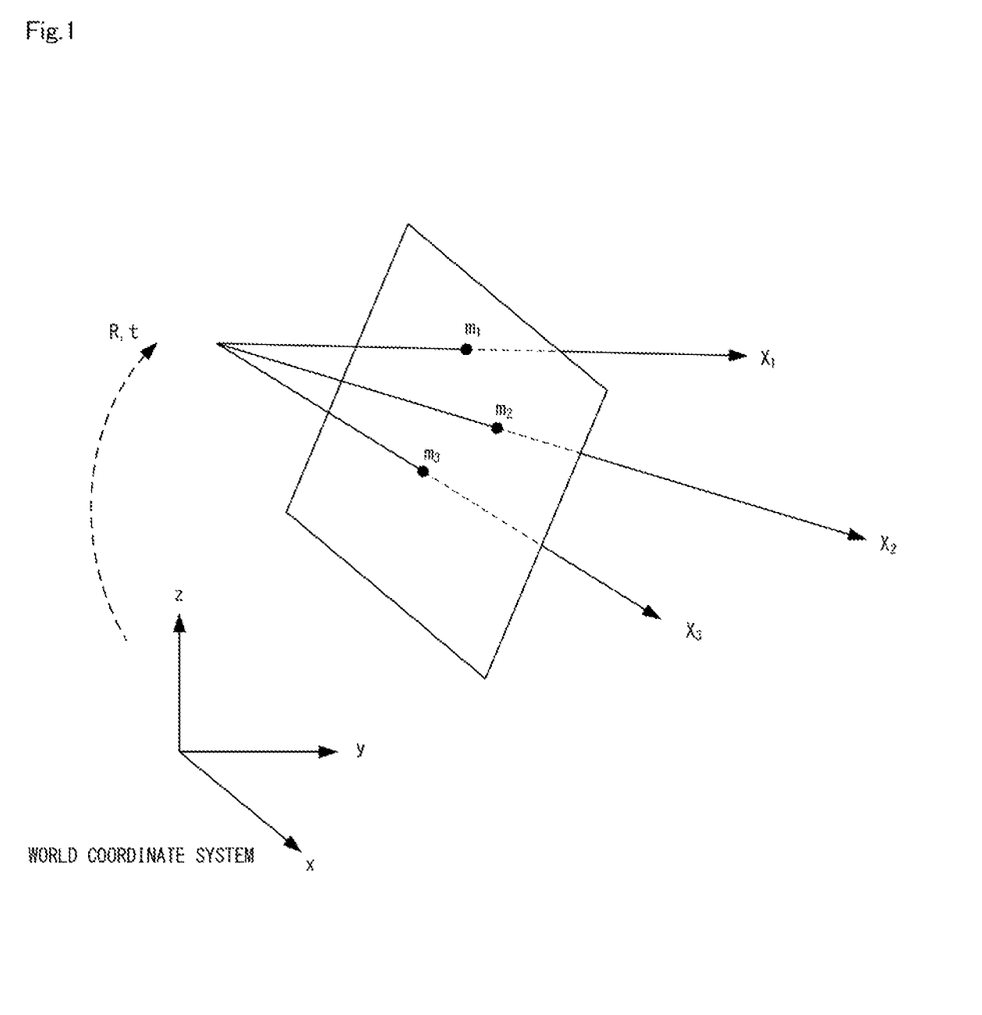
FIG. 1 is a diagram illustrating an example of a coordinate system used in an example embodiment.

A coordinate system used in the example embodiment will be described first with reference to FIG. 1. FIG. 1 is a diagram illustrating an example of the coordinate system used in the example embodiment of the invention. FIG. 1 illustrates three three-dimensional coordinates $X_1$, $X_2$, $X_3$ observed as image coordinates $m_1$, $m_2$, and $m_3$, respectively, by a camera located at a position represented by a rotation matrix R and a translation vector t relative to the origin of a world coordinate system.

Note that in the specification, a set of a given three-dimensional coordinate and a their corresponding two-dimensional coordinate in an image (referred to as an "image coordinate" hereinafter) will be referred to as a corresponding point. Additionally, the example embodiment assumes that because the internal parameters of the camera are already calibrated, image coordinates $m_1$, $m_2$, and $m_3$ are normalized using the internal parameters, for example.

Apparatus Configuration

Figure 2:
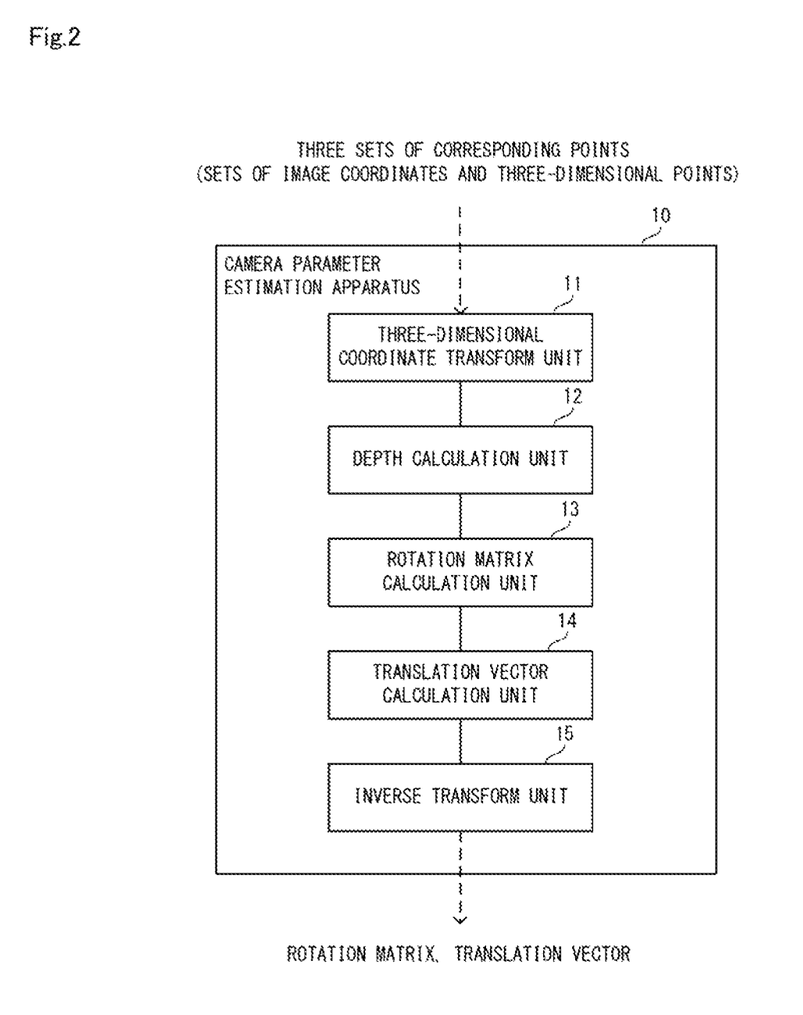
FIG. 2 is a block diagram illustrating the configuration of a camera parameter estimation apparatus according to an example embodiment.

The configuration and functions of the camera parameter estimation apparatus according to the example embodiment will be described next with reference to FIG. 2. FIG. 2 is a block diagram illustrating the configuration of the camera parameter estimation apparatus according to the example embodiment.

A camera parameter estimation apparatus 10 according to the example embodiment, illustrated in FIG. 2, is an apparatus that estimates external parameters of a camera, i.e., a rotation matrix and a translation vector of the camera, when an object is shot by the camera. As illustrated in FIG. 2, the camera parameter estimation apparatus 10 includes a three-dimensional coordinate transform unit 11, a depth calculation unit 12, a rotation matrix calculation unit 13, a translation vector calculation unit 14, and an inverse transform unit 15.

The three-dimensional coordinate transform unit 11 first obtains, as inputs, three sets of three-dimensional coordinates pertaining to the object captured by the camera, and two-dimensional coordinates (image coordinates) corresponding to the respective three-dimensional coordinates in the image captured by the camera. The three-dimensional coordinate transform unit 11 then transforms the coordinate system of the three-dimensional coordinates from world coordinates to a local coordinate system that takes one of the three-dimensional coordinates as its origin.

The depth calculation unit 12 calculates a linear transformation matrix on the basis of a projection transformation expression from each three-dimensional coordinate, which has been transformed to the local coordinate system, to the corresponding image coordinate. The linear transformation matrix is a matrix expressing a relationship between the rotation matrix, which will be described later, and depths from the camera center to each of the three-dimensional coordinates.

Next, using the orthogonality of the rotation matrix, which will be described later, the depth calculation unit 12 calculates coefficients of a quartic equation pertaining to any one of these depths, and calculates each of the depths by solving the quartic equation.

The rotation matrix calculation unit 13 calculates the rotation matrix of the camera in the local coordinate system using the respective depths and the linear transformation matrix.

The translation vector calculation unit 14 calculates the translation vector of the camera in the local coordinate system from the respective depths on the basis of the projection transformation expression. Specifically, the translation vector calculation unit 14 calculates the translation vector by substituting the rotation matrix and the depths into the projection transformation expression.

The inverse transform unit 15 performs an inverse transform of the rotation matrix and the translation vector of the camera, calculated by the local coordinate system, into the world coordinate system, and calculates a rotation matrix and a translation vector of the camera in the world coordinate system. The inverse transform unit 15 then outputs the calculated rotation matrix and translation vector as the external parameters of the camera.

In this manner, the camera parameter estimation apparatus according to the example embodiment calculates depths from the camera center to three-dimensional coordinates and a linear transformation matrix, and then, from the results of those calculations, calculates a rotation matrix and a translation vector of the camera. In other words, in the example embodiment, there is no need to execute singular value decomposition, and the local coordinate system is not defined by a two-step coordinate transform. According to the example embodiment, the rotation matrix and the translation vector, which are external parameters of the camera, can be estimated quickly in one step without using singular value decomposition.

Apparatus Operations

Figure 3:
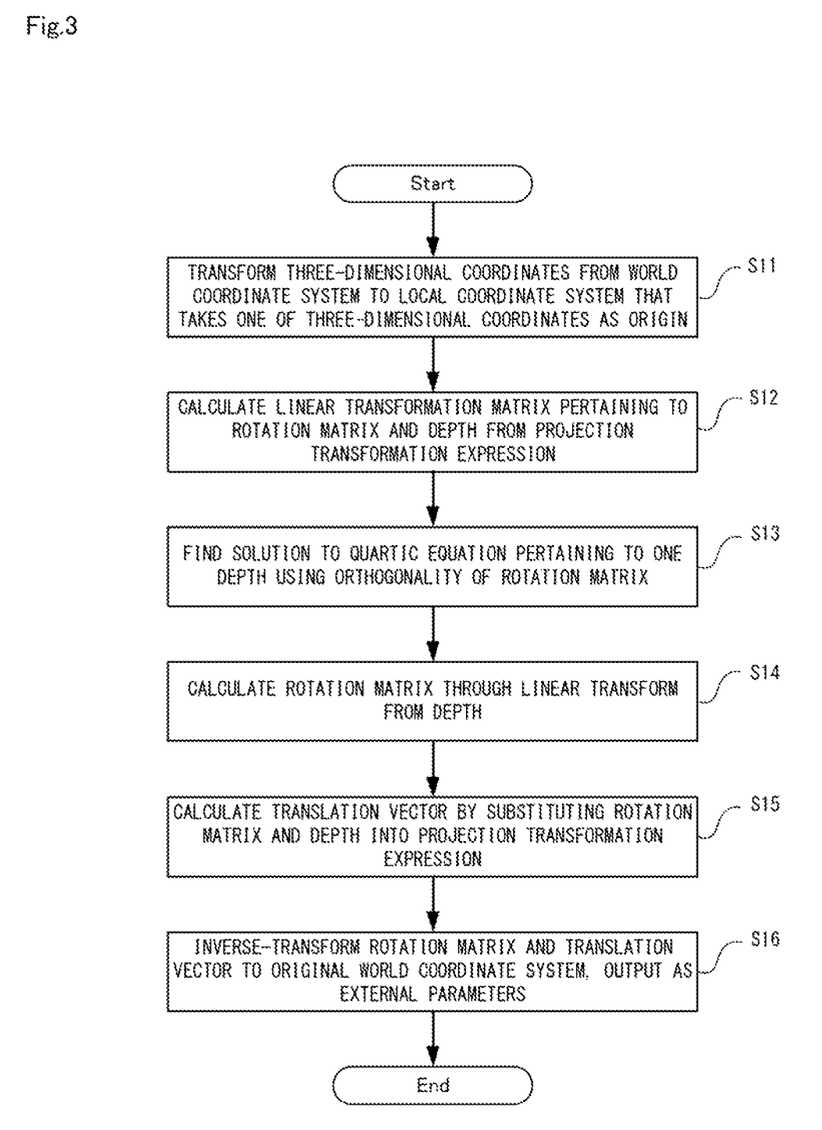
FIG. 3 is a flowchart illustrating operations of a camera parameter estimation apparatus 10 according to an example embodiment.

Operations of the camera parameter estimation apparatus 10 according to the example embodiment of the invention will be described with reference to FIG. 3. FIG. 3 is a flowchart illustrating operations of the camera parameter estimation apparatus 10 according to the example embodiment. The following descriptions will refer to FIG. 2 as appropriate. In the example embodiment, a camera parameter estimation method is implemented by operating the camera parameter estimation apparatus 10. As such, the following descriptions of the operations of the camera parameter estimation apparatus 10 also serve as descriptions of the camera parameter estimation method according to the example embodiment.

As illustrated in FIG. 3, first, when three sets of corresponding points are input to the camera parameter estimation apparatus 10, the three-dimensional coordinate transform unit 11 obtains the corresponding points. The three-dimensional coordinate transform unit 11 then transforms the coordinate system of the three sets of three-dimensional coordinates, constituted by the corresponding points, from world coordinates to a local coordinate system that takes one of the three-dimensional coordinates as its center (step S11).

However, the example embodiment assumes that the input corresponding points are not what is known as a degenerate configuration (also called a critical configuration) in the camera parameters to be estimated. This is because it is theoretically impossible to estimate the camera parameters for such corresponding points. With respect to coordinate values, it is assumed that the three-dimensional coordinates and the two-dimensional points are all different. This is because, for example, one three-dimensional coordinate corresponding to several different two-dimensional points is not something that can realistically happen.

In the camera parameter estimation apparatus 10, these inappropriate corresponding points are excluded from subsequent processing. The example embodiment may also take on a form in which an apparatus other than the camera parameter estimation apparatus 10 performs error determination for corresponding points and so on instead of the camera parameter estimation apparatus 10.

Next, the depth calculation unit 12 calculates a linear transformation matrix pertaining to the rotation matrix and the depths on the basis of a projection transformation expression for performing a projection transformation from each three-dimensional coordinate, which has been transformed to the local coordinate system in step S11, to the corresponding image coordinate (step S12).

Next, the depth calculation unit 12 calculates coefficients of a quartic equation for one depth using the orthogonality of the rotation matrix, which is calculated in a later step, to find a solution of the quartic equation, and the solution which is found is used as the depth (step S13).

In general, the solution to a quartic equation can be a complex number, but because all camera parameters are always real numbers, only real number solutions are considered in the example embodiment. The camera parameter estimation apparatus 10 may also flag the solution as no solution and end the subsequent processing when the calculation result of each step is only a complex number.

For example, the solution of a quartic equation can be a complex number when the wrong set of three-dimensional coordinates and two-dimensional points are included in the corresponding points, or when a real number solution is calculated as a complex number solution due to insufficient accuracy in the numerical calculation.

Next, the rotation matrix calculation unit 13 calculates the rotation matrix of the camera in the local coordinate system using the depth calculated in step S13 and the linear transformation matrix calculated in step S12 (step S14). Here, if there are a plurality of real number solutions to the quartic equation calculated in step S13, the rotation matrix calculation unit 13 calculates a rotation matrix for each of the plurality of depths. In other words, because a quartic equation has four real number solutions at most, the number of calculations in step S14 is at most four.

Next, the translation vector calculation unit 14 calculates the translation vector of the camera in the local coordinate system from the depth calculated in step S13 on the basis of the projection transformation expression also used in step S12 (step S15). Specifically, the translation vector calculation unit 14 calculates the translation vector by substituting the rotation matrix calculated in step S14 and the depth calculated in step S13 into the projection transformation expression. Additionally, in step S15 as well, the translation vector calculation unit 14 calculates the translation vector for all of the real number solutions calculated in step S13, in the same manner as the rotation matrix calculation unit 13.

Finally, the inverse transform unit 15 performs an inverse transform of the rotation matrix calculated in the local coordinate system in step S14 and the translation vector calculated in step S15 to the original world coordinate system, and outputs the obtained rotation matrix and translation vector as the external parameters of the camera (step S16). Additionally, in step S16, the inverse transform unit 15 performs the output for each combination obtained from all the rotation matrices calculated in step S14 and all the translation vectors calculated in step S15.

SPECIFIC EXAMPLE

A specific example of the example embodiment will be described next. The following descriptions will refer to FIGS. 1 to 3 as appropriate. In the following descriptions, "T" in superscript represents a transpose of a matrix n and a vector, "0" represents a zero matrix and a zero vector, "I" represents a unit matrix, "|| ||" represents an L2 norm of a vector, and "x" represents a cross product of three-dimensional vectors.

First, assume that the projection transformation expression between the corresponding point, which is the three-dimensional coordinate, and the image coordinate is defined by the following Formula 1. According to the following Formula 1, given ith three-dimensional coordinates $X_i=[x_i, y_i, z_i]^T$ are projected to image coordinates $m_i=[u_i,v_i,1]^T$ by the rotation matrix R and the translation vector t. In Formula 1, $d_i$ represents the depth from the camera center to $X_i$.

$$d_i m_i = RX_i + t \quad \text{[Formula 1]}$$

Next, the transformation to the local coordinate system is expressed by the following Formula 2.

$$n_x = \frac{(X_2 - X_1)}{\|(X_2 - X_1)\|} \quad \text{[Formula 2]}$$

$$n_z = \frac{n_x \times (X_3 - X_1)}{\|n_x \times (X_3 - X_1)\|}$$

$$n_y = n_z \times n_x$$

$$R_g = [n_x \ n_y \ n_z]$$

$$X_i \leftarrow R_g^T (X_i - X_1)$$

From Formula 2, the three-dimensional coordinate system in the local coordinate system is $X_1=[0,0,0]^T$, $X_2=[a,0,0]^T$, and $X_3=[b,c,0]^T$. Here, a, b, and c are the transformed coordinate values. Using this, and writing out the above Formula 1 for each corresponding point, the above Formula 1 can be expressed by the following Formula 3.

$$d_1 m_1 = t$$

$$d_2 m_2 = a r_1 + t$$

$$d_3 m_3 = b r_1 + c r_2 + t \quad \text{[Formula 3]}$$

Here, $r_j$ represents a jth column of the rotation matrix. Then, taking the difference between the first expression and the second expression and eliminate tin the above Formula 3, the following Formula 4 is obtained. In Formula 4, $d=[d_1,d_2,d_3]^T$.

$$r_1 = \frac{1}{a}(d_2 m_2 - d_1 m_1) \quad \text{[Formula 4]}$$

$$= \frac{1}{a}[-m_1 \ m_2 \ 0]\begin{bmatrix}d_1\\d_2\\d_3\end{bmatrix}$$

$$= Ad$$

Next, the difference between the first expression and the third expression is found in the above Formula 3, and the difference which is found is substituted into the above Formula 4 to obtain the following Formula 5.

$$r_2 = \frac{1}{c}\left(\left(1-\frac{b}{a}\right)d_1 m_1 + \frac{b}{a}d_2 m_2 - d_3 m_3\right) \quad \text{[Formula 5]}$$

$$= \frac{1}{c}\left[\left(\frac{b}{a}-1\right)m_1 \ -\frac{b}{a}m_2 \ m_3\right]\begin{bmatrix}d_1\\d_2\\d_3\end{bmatrix}$$

$$= Bd$$

The above Formula 4 and Formula 5 indicate that both the first column and the second column of the rotation matrix can be represented by a linear transform with the depth.

Next, the following Formula 6 is obtained from the orthonormality of the rotation matrix.

$$r_1^T r_1 - r_2^T r_2 = k^T(A^T A - B^T B)k = 0$$

$$r_1^T r_2 = k^T A^T B k = 0 \quad \text{[Formula 6]}$$

Here, k represents a vector obtained by setting any one of the three components of d to 1 and replacing the other components with new unknowns x and y. In other words, k is either $k=[1,d_2/d_1,d_3/d_1]^T=[1, x,y]^T$, $k=[d_1/d_2,1, d_3/d_2]^T=[x,1,y]^T$, or $k=[d_1/d_3,d_2/d_3,1]^T=[x,y,1]^T$.

The above Formula 6 is indefinite to a constant multiple and the depth $d_i$ is greater than or equal to zero, and Formula 6 is therefore mathematically equivalent to replacing the vector d with k. Additionally, the number of unknowns can be reduced from three to two.

Because the above Formula 6 has two constraint equations for the two variables of x and y, the solution thereof can be found. One way to do this is to eliminate either x or y from the above Formula 6 based on the theory of the resultant and reduce the variable to a single variable equation. For example, eliminating y will result in a quartic equation for x. The fact that the solution to the P3P problem is reduce to a quartic equation for one variable has also been made clear in Non-Patent Documents 1 and 2, and the fact that this clarification coincides with the above Formula 6 confirms the theoretical correctness of the invention.

Additionally, as mentioned above, there are three possibilities for k depending on which component is selected as 1. The minimum amount of computations for each coefficient of the quartic equation is obtained when the first component or the second component is set to 1 ($k=[1,x,y]^T$ or $k=[x,1,y]^T$), and the maximum amount of computations is obtained when the third component is set to 1 ($k=[x,y,1]^T$).

The reason for this is that in the second expression of the above Formula 6, the third row of a matrix $A^T B$ is all zeros, and thus selecting the first component or the second component is equivalent to placing the third component of $k^T$ multiplied from the left as zero, and the coefficient of $x^2$ or $y^2$ in the second expression of the above Formula 6 becomes zero. As such, $k=[1,x,y]^T$ or $k=[x,1,y]^T$ may be used to minimize the calculation of coefficients of the quartic equation.

In the example embodiment, a variety of known solution methods can be used to obtain the solution of the quartic equation. For example, a direct algebraic method such as Ferrari's solution or Euler's solution may be used, or a solution based on a companion matrix that applies eigenvalue eigenvector calculations may be used.

Once the solution to the quartic equation is obtained, from the above Formula 4 and Formula 5, the first column and the second column of the rotation matrix R can be calculated on the basis of a matrix-vector product, which is a simple linear transform. Scale indeterminacy caused by setting one component of k to 1 as described above can be corrected by setting the L2 norm to 1 for both the first column and the second column. In other words, k may be calculated as $k=k/\|Ak\|$ or $k=k/\|Bk\|$.

Additionally, because the third column of the rotation matrix R can be calculated by the cross product of the first column and the second column ($r_3 = r_1 \times r_2$), all the components of the rotation matrix R are calculated as indicated by the following Formula 7.

$$R = [r_1 r_2 r_1 \times r_2] \quad \text{[Formula 7]}$$

The translation vector t can then be calculated from the first expression in the above Formula 3. Because the rotation matrix R and the translation vector t calculated thus far are values in the local coordinate system, the values in the original world coordinates can be obtained by applying the inverse transformation of Formula 2. In other words, the final rotation matrix R and translation vector t are expressed by the following Formula 8.

$$R \leftarrow R R_g^T$$

$$t \leftarrow t - R R^T X_1 \quad \text{[Formula 8]}$$

The foregoing specific example will be described here in terms of steps S11 to S16 illustrated in FIG. 3.

Step S11

First, in step S11, the three-dimensional coordinate transform unit 11 transforms the three-dimensional coordinates into the local coordinate system by executing the coordinate transform expressed by the above Formula 2.

Step S12

Next, in step S12, the depth calculation unit 12 calculates a matrix A and a matrix B, which represent the linear transformation between the rotation matrix and the depths, as expressed by the above Formula 4 and Formula 5.

Step S13

Next, in step S13, the depth calculation unit 12 calculates the coefficients of the quartic equation, which is the resultant of the above Formula 6, by setting the first component or the second component of the depth to 1, and then solves the quartic equation to calculate the depth.

Step S14

Next, in step S14, the rotation matrix calculation unit 13 calculates the first column and the second column of the rotation matrix on the basis of the above Formula 4 and Formula 5, and further calculates all components of the rotation matrix on the basis of the above Formula 7.

Step S15

Next, in step S15, the translation vector calculation unit 14 calculates the translation vector on the basis of the above Formula 3.

Step S16

Finally, in step S16, the inverse transform unit 15 transforms the rotation matrix and the translation vector to the values in the original world coordinate system on the basis of the above Formula 8, and outputs the obtained rotation matrix and translation vector.

Effects of the Example Embodiment

As described above, according to the example embodiment, the P3P problem can be solved, and the external parameters can be estimated, quickly and in a single step without using singular value decomposition. The reason for this is as follows.

In the example embodiment, first, by transforming the three-dimensional coordinates of an object into a local coordinate system, the components of the rotation matrix can be expressed as a linear transformation of depth, as indicated by the above Formula 4 and Formula 5. In other words, if the depth can be calculated in the local coordinate system, the rotation matrix can be estimated directly, and the example embodiment therefore does not need to perform a two-step coordinate transformation as in the method disclosed in Non-Patent Document 2. Additionally, because the third row of the matrix A indicated in the above Formula 4 is zero, the amount of calculations for the coefficients of the quartic equation can be minimized by setting the first component or the second component of the depth vector to 1, which makes it possible to accelerate the processing.

Variations

The example embodiment is not limited to the examples described above. In the example embodiment, a variety of changes which can be understood by a person skilled in the art can be applied to the examples described above. For example, the example embodiment can also be carried out through the forms described in the following Variations.

Variation 1

In the example embodiment, when the three-dimensional coordinates input to the camera parameter estimation apparatus 10 are in the format of $X_1=[0,0,0]^T$, $X_2=[a,0,0]^T$, and $X_3=[b,c,0]^T$, the three-dimensional coordinate transform unit 11 and the inverse transform unit 15 need not execute processing. This is a case where, for example, the three-dimensional coordinates are the corner points of a square marker. In such a case, the local coordinate system and the world coordinate system coincide, which makes the transformation to the local coordinate system becomes unnecessary, and as a result, the amount of calculations performed by the camera parameter estimation apparatus 10 can be reduced.

Variation 2

In the example embodiment, the definition of the local coordinate system is not limited to $X_1=[0,0,0]^T$, $X_2=[a,0,0]^T$, and $X_3=[b,c,0]^T$. For example, the local coordinate system may be a coordinate system based on a y=0 plane. In this case, the first column and the third column of the rotation matrix may be calculated, and the cross product thereof may then be calculated as the second column. However, regardless of how the local coordinate system is defined, it is matched by a rigid body transform, and is therefore mathematically an equivalent problem.

Variation 3

In the example embodiment, the depth calculation unit 12 may output all solutions to the rotation matrix calculation unit 13, or, if the nature of the depth is taken into account, may output only positive real number solutions. Additionally, taking into account the possibility that a small imaginary component may ride on the real number solution due to error in the numerical calculations, the depth calculation unit 12 may extract only the real part of the imaginary solution and output only the real part of the extracted imaginary solution.

Variation 4

In the example embodiment, if all the solutions obtained by the depth calculation unit 12 are imaginary, the camera parameter estimation apparatus 10 may suspend the subsequent processing, return a flag indicating no solution, and end the processing.

Program

A program according to the example embodiment may be any program that causes a computer to execute steps S11 to S16 illustrated in FIG. 3. The camera parameter estimation apparatus and the camera parameter estimation method according to the example embodiment can be realized by installing the program in a computer and executing the program. In this case, a processor of the computer performs processing by functioning as the three-dimensional coordinate transform unit 11, the depth calculation unit 12, the rotation matrix calculation unit 13, the translation vector calculation unit 14, and the inverse transform unit 15.

The program according to the example embodiment may be executed by a computer system constructed from a plurality of computers. In this case, for example, each of the computers may function as one of the three-dimensional coordinate transform unit 11, the depth calculation unit 12, the rotation matrix calculation unit 13, the translation vector calculation unit 14, and the inverse transform unit 15.

Figure 4:
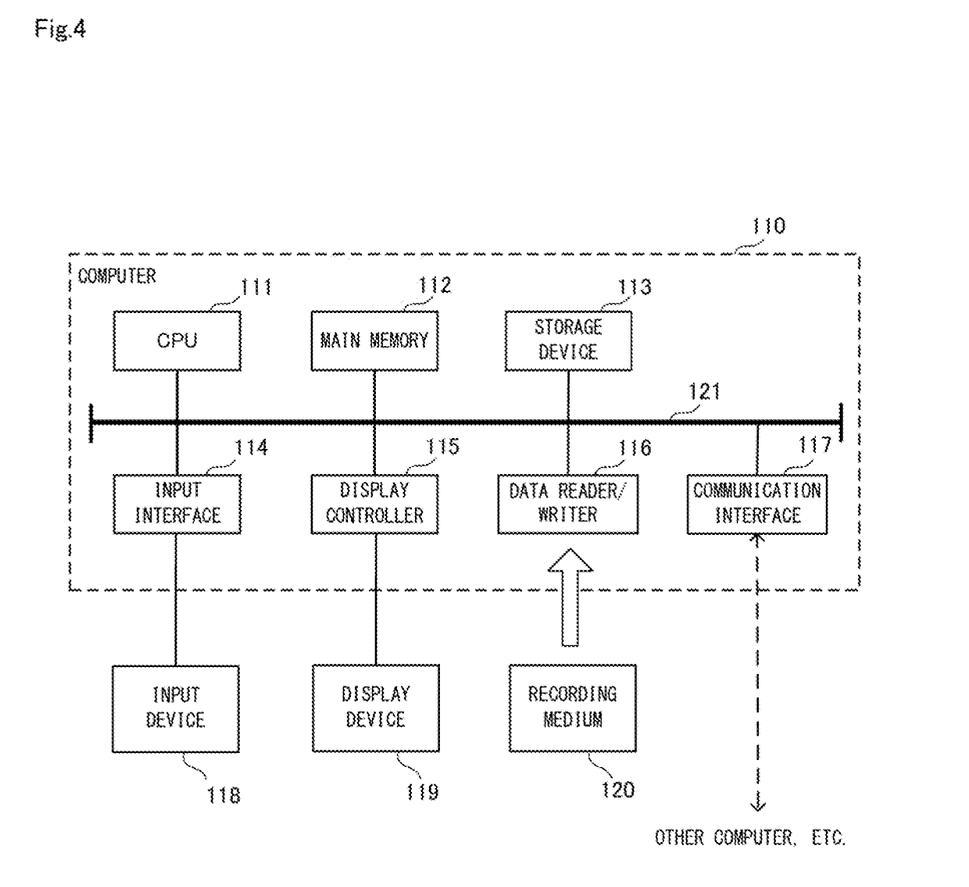
FIG. 4 is a block diagram illustrating an example of a computer realizing a camera parameter estimation apparatus according to an example embodiment.

A computer that realizes the camera parameter estimation apparatus 10 by executing the program according to the example embodiment will be described with reference to FIG. 4. FIG. 4 is a block diagram illustrating an example of a computer realizing the camera parameter estimation apparatus according to the example embodiment of the invention. However, the computer according to the example embodiment is not limited to the computer illustrated in FIG. 4, and may be a computer installed in a device such as a robot, a smartphone, or the like, for example.

As illustrated in FIG. 4, a computer 110 includes a CPU (Central Processing Unit) 111, main memory 112, a storage device 113, an input interface 114, a display controller 115, a data reader/writer 116, and a communication interface 117. These units are connected by a bus 121 so as to be capable of data communication with each other. Also, in addition to, or instead of, the CPU 111, the computer 110 may include a GPU (Graphics Processing Unit) or a FPGA (Field-Programmable Gate Array).

The CPU 111 loads the program (codes) according to the example embodiment, which is stored in the storage device 113, into the main memory 112, and executes the codes according to a prescribed sequence, thereby carrying out various types of operations. The main memory 112 is typically a volatile storage device such as DRAM (Dynamic Random-Access Memory) or the like. The program according to the example embodiment is stored in a computer-readable recording medium 120 and provided in such a state. Note that the program according to the example embodiment may be distributed over the Internet, which is connected via the communication interface 117.

In addition to a hard disk drive, a semiconductor storage device such as Flash memory or the like can be given as a specific example of the storage device 113. The input interface 114 facilitates data transfer between the CPU 111 and an input device 118 such as a keyboard and a mouse. The display controller 115 can be connected to a display device 119, and controls displays made in the display device 119.

The data reader/writer 116 facilitates data transfer between the CPU 111 and the recording medium 120, reads out programs from the recording medium 120, and writes results of processing performed by the computer 110 into the recording medium 120. The communication interface 117 facilitates data exchange between the CPU 111 and other computers.

A generic semiconductor storage device such as CF (Compact Flash (registered trademark)), SD (Secure Digital), or the like, a magnetic recording medium such as a flexible disk or the like, an optical recording medium such as a CD-ROM (Compact Disk Read Only Memory) or the like, and so on can be given as specific examples of the recording medium 120.

Note that the camera parameter estimation apparatus 10 according to the example embodiment can also be realized using hardware corresponding to the respective units, instead of a computer in which a program is installed. Furthermore, the camera parameter estimation apparatus 10 may be partially realized by a program, with the remaining parts realized by hardware.

All or parts of the above-described example embodiment can be expressed as Supplementary Note 1 to Supplementary Note 9, described hereinafter, but is not intended to be limited to the following descriptions.

Supplementary Note 1

A camera parameter estimation apparatus including:
a three-dimensional coordinate transforming unit takes three sets of three-dimensional coordinates pertaining to an object captured by a camera and two-dimensional coordinates corresponding to respective ones of the three-dimensional coordinates in an image that has been captured, and transforms a coordinate system of the three-dimensional coordinates from a world coordinate system to a local coordinate system that takes one of the three-dimensional coordinates as an origin;
a depth calculation unit calculates a linear transformation matrix on the basis of a projection transformation expression from the three-dimensional coordinates transformed into the local coordinate system to the two-dimensional coordinates, calculates a coefficient of a quartic equation pertaining to any one of depths from a center of the camera to respective ones of the three-dimensional coordinates, and calculates each of the depths by solving the quartic equation;
a rotation matrix calculation unit calculates a rotation matrix of the camera in the local coordinate system using the respective depths and the linear transformation matrix;
a translation vector calculation unit configured to calculates a translation vector of the camera in the local coordinate system from the respective depths on the basis of the projection transformation expression; and
an inverse transform unit calculates a rotation matrix and a translation vector of the camera in the world coordinate system by performing an inverse transform of the rotation matrix and the translation vector of the camera in the local coordinate system.

Supplementary Note 2

The camera parameter estimation apparatus according to Supplementary Note 1,
wherein the local coordinate system is a coordinate system expressed by linearly transforming one of the depths by two columns of vectors constituting the rotation matrix.

Supplementary Note 3

The camera parameter estimation apparatus according to Supplementary Note 1 or 2,
wherein when calculating the coefficient of the quartic equation, the depth calculation unit selects a depth at which an amount of calculation is a minimum.

Supplementary Note 4

A camera parameter estimation method including:
(a) a step of taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin;
(b) a step of calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation;
(c) a step of calculating a rotation matrix of the camera in the local coordinate system using the respective depths and the linear transformation matrix;
(d) a step of calculating a translation vector of the camera in the local coordinate system from the respective depths on the basis of the projection transformation expression; and
(e) a step of calculating a rotation matrix and a translation vector of the camera in the world coordinate system by performing an inverse transform of the rotation matrix and the translation vector of the camera in the local coordinate system.

Supplementary Note 5

The camera parameter estimation method according to Supplementary Note 4,
wherein the local coordinate system is a coordinate system expressed by linearly transforming one of the depths by two columns of vectors constituting the rotation matrix.

Supplementary Note 6

The camera parameter estimation method according to Supplementary Note 4 or 5,
wherein in the (b) step, when calculating the coefficient of the quartic equation, a depth at which an amount of calculation is a minimum is selected.

Supplementary Note 7

A computer-readable recording medium storing a program including commands causing a computer to execute:
(a) a step of taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin;
(b) a step of calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation;
(c) a step of calculating a rotation matrix of the camera in the local coordinate system using the respective depths and the linear transformation matrix;
(d) a step of calculating a translation vector of the camera in the local coordinate system from the respective depths on the basis of the projection transformation expression; and
(e) a step of calculating a rotation matrix and a translation vector of the camera in the world coordinate system by performing an inverse transform of the rotation matrix and the translation vector of the camera in the local coordinate system.

Supplementary Note 8

The computer-readable recording medium according to Supplementary Note 7,
wherein the local coordinate system is a coordinate system expressed by linearly transforming one of the depths by two columns of vectors constituting the rotation matrix.

Supplementary Note 9

The computer-readable recording medium according to Supplementary Note 7 or 8,
wherein in the (b) step, when calculating the coefficient of the quartic equation, a depth at which an amount of calculation is a minimum is selected.

While the invention has been described above with reference to an example embodiment, the invention is not intended to be limited to the above example embodiment. Many variations can be made, by one of ordinary skill in the art, on the configuration and details of the invention without departing from the scope of the invention.

INDUSTRIAL APPLICABILITY

As described above, according to the invention, the P3P problem can be solved, and the external parameters can be estimated, quickly and in a single step without using singular value decomposition. The invention is useful in fields that require external parameters of a calibrated camera to be estimated, e.g., robot control, image processing, and the like.

REFERENCE SIGNS LIST

10 Camera parameter estimation apparatus
11 Three-dimensional coordinate transform unit
12 Depth calculation unit
13 Rotation matrix calculation unit
14 Translation vector calculation unit
15 Inverse transform unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A camera parameter estimation apparatus comprising:
at least one memory storing instructions; and
at least one processor configured to execute the instructions to:
take three sets of three-dimensional coordinates pertaining to an object captured by a camera and two-dimensional coordinates corresponding to respective ones of the three-dimensional coordinates in an image that has been captured, and transform a coordinate system of the three-dimensional coordinates from a world coordinate system to a local coordinate system that takes one of the three-dimensional coordinates as an origin;
calculate a linear transformation matrix on the basis of a projection transformation expression from the three-dimensional coordinates transformed into the local coordinate system to the two-dimensional coordinates, calculate a coefficient of a quartic equation pertaining to any one of depths from a center of the camera to respective ones of the three-dimensional coordinates, and calculate each of the depths by solving the quartic equation;
calculate a rotation matrix of the camera in the local coordinate system using the respective depths and the linear transformation matrix;
calculate a translation vector of the camera in the local coordinate system from the respective depths on the basis of the projection transformation expression; and
calculate a rotation matrix and a translation vector of the camera in the world coordinate system by performing an inverse transform of the rotation matrix and the translation vector of the camera in the local coordinate system.

2. The camera parameter estimation apparatus according to claim 1,
wherein the local coordinate system is a coordinate system expressed by linearly transforming one of the depths by two columns of vectors constituting the rotation matrix.

3. The camera parameter estimation apparatus according to claim 1,
wherein when calculating the coefficient of the quartic equation, the processor configured to execute the instructions to select a depth at which an amount of calculation is a minimum.

4. A camera parameter estimation method comprising:
taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin;
calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation;
calculating a rotation matrix of the camera in the local coordinate system using the respective depths and the linear transformation matrix;
calculating a translation vector of the camera in the local coordinate system from the respective depths on the basis of the projection transformation expression; and
calculating a rotation matrix and a translation vector of the camera in the world coordinate system by performing an inverse transform of the rotation matrix and the translation vector of the camera in the local coordinate system.

5. The camera parameter estimation method according to claim 4,
wherein the local coordinate system is a coordinate system expressed by linearly transforming one of the depths by two columns of vectors constituting the rotation matrix.

6. The camera parameter estimation method according to claim 4,
wherein in the calculating the rotation matrix of the camera, when calculating the coefficient of the quartic equation, a depth at which an amount of calculation is a minimum is selected.

7. A non-transitory computer-readable recording medium that includes a program recorded thereon, the program including instructions that causes a computer to carry out:
taking three sets of three-dimensional coordinates pertaining to an object captured by a camera and two-dimensional coordinates corresponding to respective ones of the three-dimensional coordinates in an image that has been captured, and transforming a coordinate system of the three-dimensional coordinates from a world coordinate system to a local coordinate system that takes one of the three-dimensional coordinates as an origin;
calculating a linear transformation matrix on the basis of a projection transformation expression from the three-dimensional coordinates transformed into the local coordinate system to the two-dimensional coordinates, calculating a coefficient of a quartic equation pertaining to any one of depths from a center of the camera to respective ones of the three-dimensional coordinates, and calculating each of the depths by solving the quartic equation;
calculating a rotation matrix of the camera in the local coordinate system using the respective depths and the linear transformation matrix;
calculating a translation vector of the camera in the local coordinate system from the respective depths on the basis of the projection transformation expression; and
calculating a rotation matrix and a translation vector of the camera in the world coordinate system by performing an inverse transform of the rotation matrix and the translation vector of the camera in the local coordinate system.

8. The non-transitory computer-readable recording medium according to claim 7,
wherein the local coordinate system is a coordinate system expressed by linearly transforming one of the depths by two columns of vectors constituting the rotation matrix.

9. The non-transitory computer-readable recording medium according to claim 7,
wherein in the calculating the rotation matrix of the camera, when calculating the coefficient of the quartic equation, a depth at which an amount of calculation is a minimum is selected.

* * * * *